(12) United States Patent
Vester et al.

(10) Patent No.: US 12,318,988 B2
(45) Date of Patent: Jun. 3, 2025

(54) MULTI PASS EXTRUDATE COOLING TANK AND METHOD

(71) Applicant: Reel Power Licensing Corp., Oklahoma City, OK (US)

(72) Inventors: Richard Vester, York, PA (US); Steven Gillmeister, Catonsville, MD (US); Thomas Trevor Bludis, Reisterstown, MD (US); Robert H. Bessemer, Allison Park, PA (US)

(73) Assignee: Reel Power Licensing Corp., Oklahoma City, OK (US)

( * ) Notice: Subject to any disclaimer, the term of this patent is extended or adjusted under 35 U.S.C. 154(b) by 0 days.

(21) Appl. No.: 18/474,825

(22) Filed: Sep. 26, 2023

(65) Prior Publication Data

US 2024/0017464 A1    Jan. 18, 2024

Related U.S. Application Data

(63) Continuation of application No. 17/150,783, filed on Jan. 15, 2021, now abandoned.

(60) Provisional application No. 62/961,404, filed on Jan. 15, 2020.

(51) Int. Cl.
  *B29C 48/88*    (2019.01)
  *B29C 48/00*    (2019.01)
  *B29C 48/06*    (2019.01)

(52) U.S. Cl.
  CPC .......... *B29C 48/919* (2019.02); *B29C 48/022* (2019.02); *B29C 48/06* (2019.02)

(58) Field of Classification Search
  CPC . B29C 48/0022; B29C 48/022; B29C 48/025; B29C 48/06; B29C 48/10; B29C 48/903; B29C 48/905; B29C 48/9105; B29C 48/913; B29C 48/919; B29C 2948/92514; B29C 2948/92704; B29C 2948/92923
  See application file for complete search history.

(56) References Cited

U.S. PATENT DOCUMENTS

| | | | | |
|---|---|---|---|---|
| 5,096,634 A * | 3/1992 | Tsadares | ............... | B29C 48/908 425/170 |
| 5,645,861 A * | 7/1997 | Czarnik | ............... | B29C 48/906 264/209.4 |
| 2020/0368955 A1 * | 11/2020 | Laporte | ............... | B29C 48/905 |

* cited by examiner

*Primary Examiner* — Xiao S Zhao
*Assistant Examiner* — Joseph S Leyson
(74) *Attorney, Agent, or Firm* — Phillips Murrah PC; Martin G. Ozinga (57) ABSTRACT

An extrudate cooling tank having cooling water chambers adapted for running passage of extrudate serially therethrough at a preselected regulated variable pressures with water in the chambers being at different temperatures, and a wheel-servo motor combination hingedly connected to the chamber and being movable with respect thereto between a first position with the wheel engaging running extrudate and a second position with the wheel remote from engagement with the extrudate.

15 Claims, 3 Drawing Sheets

MULTI PASS EXTRUDATE COOLING TANK AND METHOD

CROSS REFERENCE TO RELATED PATENT APPLICATIONS

This application is a continuation of U.S. application Ser. No. 17/150,783, filed 15 Jan. 2021. The '083 application claims, under 35 USC 120, the benefit of the priority of U.S. Provisional Patent Application Ser. No. 62/961,404, entitled "Multi Pass Extrudate Cooling Tank and Method", filed 15 Jan. 2020 by Novatec, Inc. as Applicant, naming Robert H. Bessemer as inventor.

STATEMENT REGARDING FEDERALLY SPONSORED RESEARCH OR DEVELOPMENT

Not applicable. This invention was conceived and developed entirely using private source funding; this patent application is being filed and paid for entirely by private source funding.

BACKGROUND OF THE INVENTION

This invention relates to manufacture of small diameter polymeric tubing by extrusion, and more particularly relates to the cooling and sizing of such small diameter polymeric tubing after the extrusion process has been completed.

SUMMARY STATEMENT OF THE INVENTION

In one of its aspects, this invention provides an extrudate cooling tank for cooling tubular extrudate that has been formed by an extrusion process from polymer material. The extrudate cooling tank preferably includes a water filled pressure controlled chamber adapted for running passage of the tubular plastic extrudate therethrough. Respective ends of the chamber define a chamber extrudate entrance and a chamber extrudate exit. The controlled pressure chamber may have a divider for separating the chamber interior into a plurality of extrudate cooling zones. Cooling water is maintained in the vacuum chamber; the pressure in the chamber may be maintained at below atmospheric, while maintaining the water within the chamber.

The extrudate cooling tank preferably further includes an atmospheric pressure water filled extrudate cooling chamber adjacent to the regulated pressure chamber for continued running passage of the polymer extrudate therethrough. The atmospheric pressure extrudate cooling chamber, of which there may be plural subparts or subchambers, has an atmospheric cooling chamber extrudate exit and an atmospheric cooling chamber extrudate entrance, which preferably contiguously adjoins the vacuum cooling chamber extrudate exit.

The extrudate cooling tank preferably further includes a first rotatable extrudate puller wheel preferably hingedly connected to one of the atmospheric cooling chambers and positioned to receive running extrudate exiting the vacuum chamber. The extrudate puller wheel reverses the direction and controls the speed of the extrudate running within the atmospheric cooling chamber.

The extrudate cooling tank further preferably includes a rotatable extrudate guide wheel preferably also hingedly connected to one of the atmospheric pressure cooling chambers. The guide wheel receives running extrudate from the puller wheel, helps to control speed of the extrudate, and serves to reverse direction of the running extrudate a second time within the atmospheric pressure cooling chamber prior to the extrudate exiting the cooling tank. Variable speed servo-type motors preferably are provided drivingly connected to each of the wheels for controlling speed thereof thereby to regulate outer diameter, wall thickness, and other parameters of the extrudate. The motors and their respective wheels are preferably provided in unitary assemblies such that the motor-wheel combination can be rotatably moved about a hinge-like connection between positions at which the wheel engages the extrudate and at which the wheel is disengaged from the extrudate.

In another of its aspects, the extrudate cooling tank preferably includes a preskinner chamber contiguously adjoining the regulated pressure chamber at the extrudate entrance. The preskinner chamber retains water in surrounding contact with the running extrudate as the running extrudate passes through the extrudate entrance into the chamber.

An airwipe chamber continuously adjoins the atmospheric pressure cooling chamber at the extrudate exit and serves to remove water from the running extrudate exterior upon the extrudate exiting the atmospheric pressure cooling chamber while precluding escape of water from the cooling chamber extrudate exit.

In yet another one of its aspects, this invention provides a method for cooling tubular plastic running extrudate after extrusion forming thereof, where the method includes feeding a running extrudate into a water bath that is at a first temperature within a first chamber while maintaining that chamber at a preselected regulated pressure, which may be vacuum. The method preferably continues with the running extrudate passing through an atmospheric pressure water bath that is at a second temperature lower than the first chamber, with the extrudate passing through and out of the first chamber while the method continues to maintain the first chamber at the preselected pressure, such as vacuum. The method preferably proceeds with passing the running extrudate through a water bath in yet another chamber at a third temperature, which is preferably higher than the second temperature but lower than the first temperature, with the third water bath also being at atmospheric pressure. The baths at different temperatures facilitate curing of the running extrudate, to stabilize physical properties as desired.

The method further proceeds by controlling passage of the running extrudate through the first and second water baths to a first speed. The method preferably further includes controlling passage of the running extrudate passing through an initial portion of a third water bath at a first speed and thereafter controlling passage of the extrudate through the remaining portion of the third water bath at a second speed. The method preferably still further includes regulating the first and second speeds to adjust the outer diameter, wall thickness and other parameters of the running extrudate to desired values as the extrudate is cooled while passing through the baths and chambers.

In still another one if its method aspects, this invention provides a method for cooling tubular plastic running extrudate after extrusion die forming thereof where the method commences with feeding the running extrudate into a first temperature water bath within a chamber while maintaining the chamber at a preselected pressure, which may be vacuum. The method continues by passing the running extrudate through a first atmospheric pressure water bath at a second temperature lower than the first temperature. The method yet further includes passing the running extrudate through a second atmospheric water bath at a third temperature higher than the second temperature but lower than the first temperature. The method further proceeds by controlling speed of passage of the running extrudate through the first temperature water bath to the exit speed of the extrudate from the extrusion die and may conclude in this aspect by adjusting outer diameter and wall thickness of the running extrudate passing through the first and second atmospheric pressure water baths by controlling speed of passage of the running extrudate passing therethrough. In this one of its aspects, the method further includes controlling speed of passage of the running extrudate through each of the first and second atmospheric pressure water baths separately.

In a sub-aspect of this aspect of the invention, the method further includes adjusting speed of a motor turning a puller wheel engaging the extrudate thereby controlling speed of the extrudate to regulate extrudate outer diameter, wall thickness, concentricity, and ovality, and to prevent extrudate shrinkage, by algorithmic processing data of (i) extrudate strain measured during passage through one of the water baths, (ii) ultrasonically measured first extrudate dimensional parameters measured during the running passage through one of the water baths, and (iii) laser-measured selected second extrudate dimensional parameter data measured during running passage through one of the water baths.

In this one of its aspects, the invention further includes controlling the water bath temperatures independently one of another. The water baths are preferably contiguous. When the puller wheel is used in the course of the method of the invention, the method further includes positioning the puller wheel within one of the atmospheric pressure water baths, positioning the motor outside the water baths, and providing a hinge for moving the motor-wheel combination permitting the wheel to engage and de-engage as respecting the extrudate.

In still another one of its aspects, this invention provides an extrudate cooling tank, which includes a sub-atmospheric pressure first temperature water chamber adapted for running passage of extrudate therethrough. The tank further includes an atmospheric pressure second temperature water chamber adapted for running passage of the extrudate therethrough, an atmospheric pressure third temperature water chamber adapted for running passage of the extrudate therethrough, a rotatable extrudate puller wheel within the third temperature water chamber and positioned for receivable engaging running extrudate entering the third temperature water chamber and rotatably controlling speed of such running extrudate. In this aspect of the invention, the extrudate cooling tank preferably includes a variable speed motor connected to the puller wheel and adjusting speed thereof to regulate outer diameter and wall thickness of the extrudate.

In the extrudate cooling tank aspect of the invention, the cooling tank may further include a processor for adjusting speed of the motor turning the puller wheel, thereby controlling speed of the extrudate to regulate extrudate outer diameter, wall thickness, concentricity, ovality, and to prevent extrudate shrinkage, with the processor receiving data for input to an included algorithm to adjust motor speed, where the data comes from a strain gauge for measuring extrudate strain during running passage through the tank, an ultrasonic gauge for measuring selected first extrudate dimensional parameters during running passage through the tank, and a laser gauge for measuring selected second extrudate dimensional parameters during running passage through the tank. The data input to the algorithm can be strain gauge data, ultrasonic gauge data, laser gauge data, or a combination of any of these.

In still another aspect of the invention, the cooling tank preferably includes an extrudate guide wheel hingedly rotatably movable to a position within the third temperature water chamber for receivably engaging running extrudate having passed around the puller wheel and includes a second variable speed motor connected to the guide wheel and adjusting speed thereof to further regulate outer diameter and wall thickness of the extrudate.

In still another manifestation of the apparatus aspect of the invention, the extrudate cooling tank may include an extrudate guide wheel mounted within the third temperature water chamber for receivably engaging running extrudate having passed around the puller wheel with a variable speed motor connecting to the extrudate guide wheel and adjusting speed thereof to further regulate outer diameter, wall thickness, and other physical parameters of the extrudate.

In one of the extrudate cooling tank aspects of the invention, the cooling tank further preferably includes a preskinner chamber adjoining the first temperature water chamber at the extrudate entrance for retaining water in surrounding contact with the running extrudate as the running extrudate passes into the first temperature water chamber. In this portion of the cooling tank aspect of the invention, the cooling preferably tank further includes an air wipe chamber adjoining the third temperature water chamber at an extrudate exit therefrom, with the air wipe chamber removing water from the running extrudate exterior when the extrudate is exiting the third temperature water chamber. The air wipe chamber precludes escape of water from the third water temperature chamber as the running extrudate exits the chamber.

In still another one of its aspects, this invention provides a method for cooling tubular running extrudate after extrusion die forming thereof, where the method commences with feeding the running extrudate into a first temperature water bath within a chamber while maintaining the chamber at a preselected pressure which may be subatmospheric and even a relatively high vacuum. The method proceeds by passing the running extrudate through a first atmospheric pressure water bath at a second temperature lower than the first temperature. The method continues with passing the running extrudate through a second atmospheric pressure water bath at a third temperature higher than the second temperature, but lower than the first temperature. The method continues with controlling passage of the running extrudate through the first temperature water bath to match the exit speed of the extrudate from the extrusion die. The method further continues with adjusting outer diameter and wall thickness of the running extrudate passing through the first and second atmospheric water baths by controlling speed of passage of the running extrudate passing therethrough.

The method further preferably includes controlling speed of passage of the running extrudate through the first and second atmospheric pressure water baths separately.

In yet another of its aspects, the method of the invention further includes adjusting speed of a motor turning a puller wheel engaging the extrudate, thereby controlling speed of the extrudate to regulate extrudate outer diameter, wall thickness, concentricity, and ovality, and to prevent extrudate shrinkage, by algorithmic processing data of at least one of (i) extrudate strain measured during running passageway through one of the water baths, (ii) ultrasonically measured selected first extrudate dimensional parameters during running passage through one of the water baths, and (iii) laser measured selected second extrudate dimensional parameters during running passage through one of the water baths.

In the course of practice of this aspect of the method, the water bath temperatures are preferably controlled independently one of another. The water baths are preferably contiguous one with another.

The following detailed description is merely exemplary in nature and is not intended to limit the described embodiments of the invention or uses of the described embodiments. As used herein, the words "exemplary" and "illustrative" mean "serving as an example, instance, or for illustration." Any implementation or embodiment or abstract disclosed herein as being "exemplary" or "illustrative" is not necessarily to be construed as preferred or advantageous over other implementations, aspects, or embodiments. All of the implementations or embodiments described in the detailed description are exemplary implementations and embodiments provided to enable persons of skill in the art to make and to use the implementations and embodiments as disclosed below, to otherwise practice the invention, and are not intended to limit the scope of the invention, which is defined by the claims.

Furthermore, by this disclosure, there is no intention on the part of the Applicant to be bound by any express or implied theory presented in the preceding materials, including but not limited to the summary of the invention or the description of the prior art, or in the following detailed description of the invention. It is to be understood that the specific implementations, devices, processes, aspects, and the like illustrated in the attached drawings and described in the following portion of the application, usually referred to as the "specification," are simply exemplary embodiments of the inventive concepts defined in the claims. Accordingly, specific dimensions and other physical characteristics relating to the embodiments disclosed herein are not to be considered as limiting as respecting the invention unless the claims or the specification expressly state otherwise.

DESCRIPTION OF THE DRAWINGS

The running extrudate is not illustrated in FIGS. 2 and 3 in order to enhance the viewer's understanding of the drawings and the invention.

DESCRIPTION OF THE INVENTION

Figure 1:
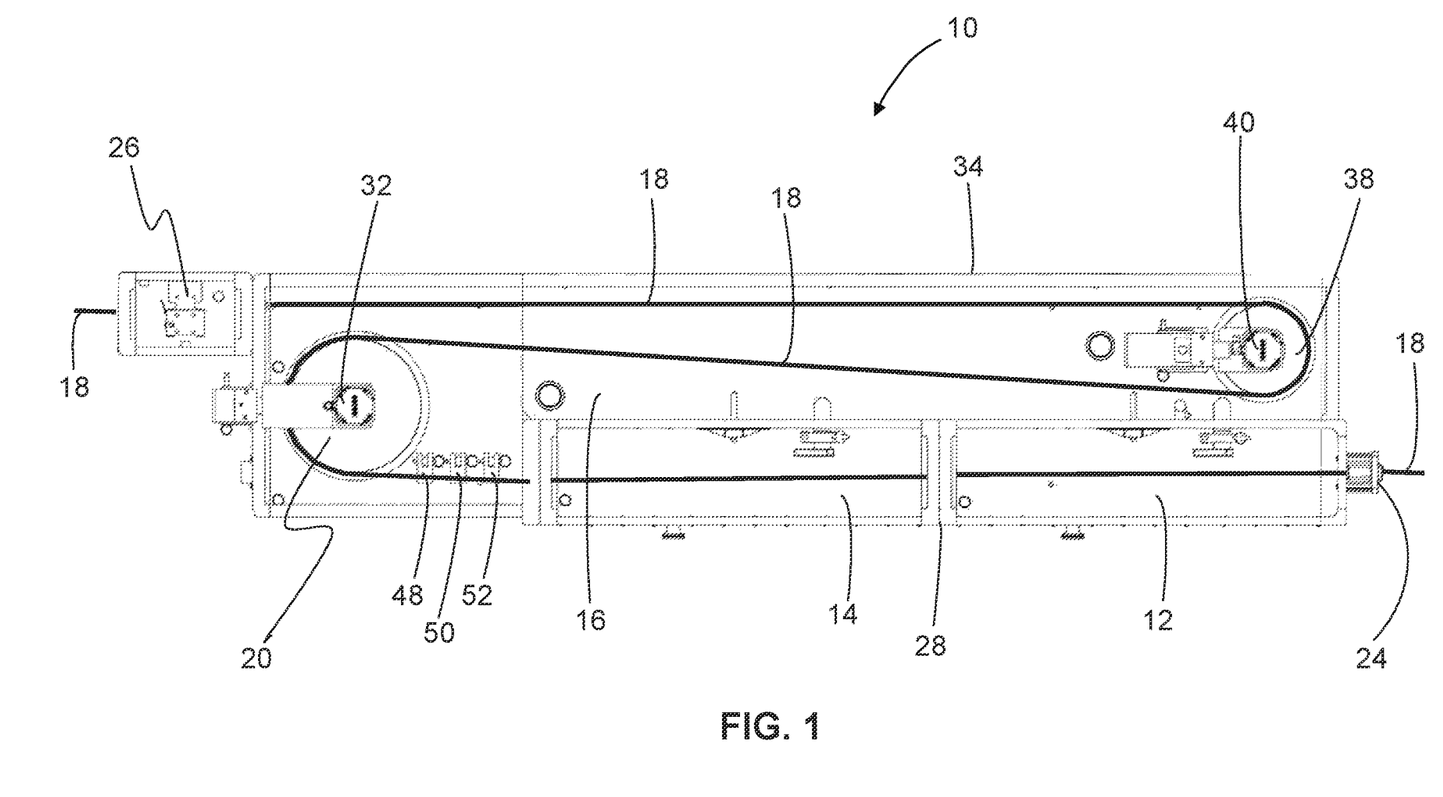
FIG. 1 is a top view of an extrudate cooling tank in accordance with aspects of the invention.

Referring to the drawings an extrudate cooling tank in accordance with aspects of the invention is illustrated generally 10 and includes three water-filled cooling chambers, with the three chambers being designated 12, 14, and 16 in FIG. 1. Chambers 12, 14, and 16 are all preferably filled with water, with the water in each of the chambers preferably being maintained at different temperatures. First chamber 12 is desirably maintained at a sub-atmospheric, even high vacuum, pressure while second and third chambers 14 and 16 are desirably maintained at atmospheric pressure, or perhaps even above.

Chambers 12, 14, and 16 are adapted for running passage of extrudate therethrough, where the extrudate is designated generally 18 in FIG. 1. The running extrudate preferably passes initially through first preferably "vacuum" chamber 12, then through second "atmospheric" chamber 14, and then through third "atmospheric" chamber 16, before exiting tank 10 at the left-hand side of FIG. 1.

Tank 10 further includes a first rotatable extrudate puller wheel, designated generally 20, with wheel 20 preferably mounted within third chamber 16 as illustrated in FIG. 1. First rotatable extrudate puller wheel 20 is positioned to receivably engage running extrudate 18 as that extrudate enters third water filled atmospheric chamber 16. Rotatable extrudate puller wheel 20 is driven to rotatably control speed of extrudate 18 running through tank 10.

Figure 2:
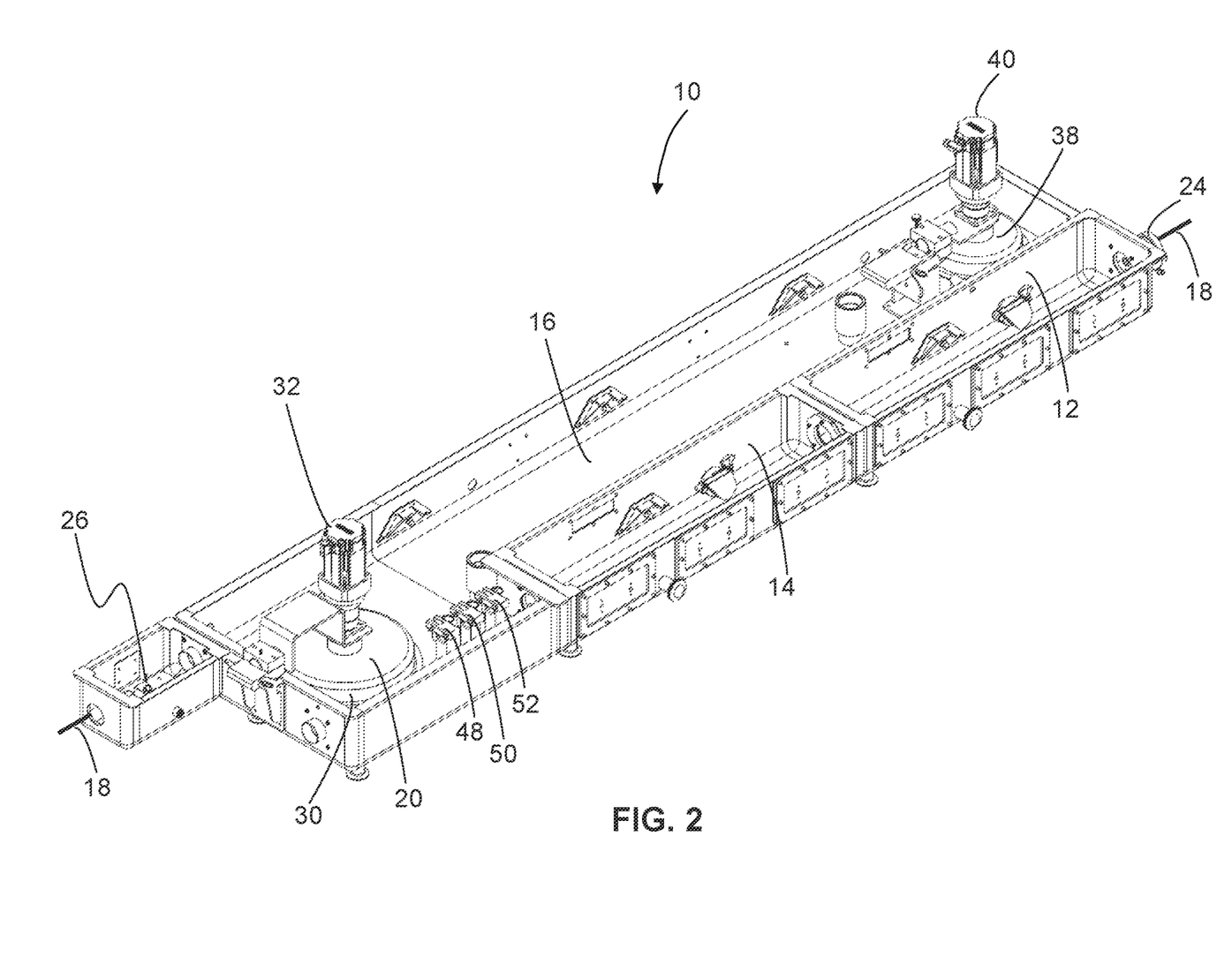
FIG. 2 is an isometric view, in greater detail, of the extrudate cooling tank shown in FIG. 1, with the motor-wheel combinations positioned for wheel engagement with running extrudate.
Figure 3:
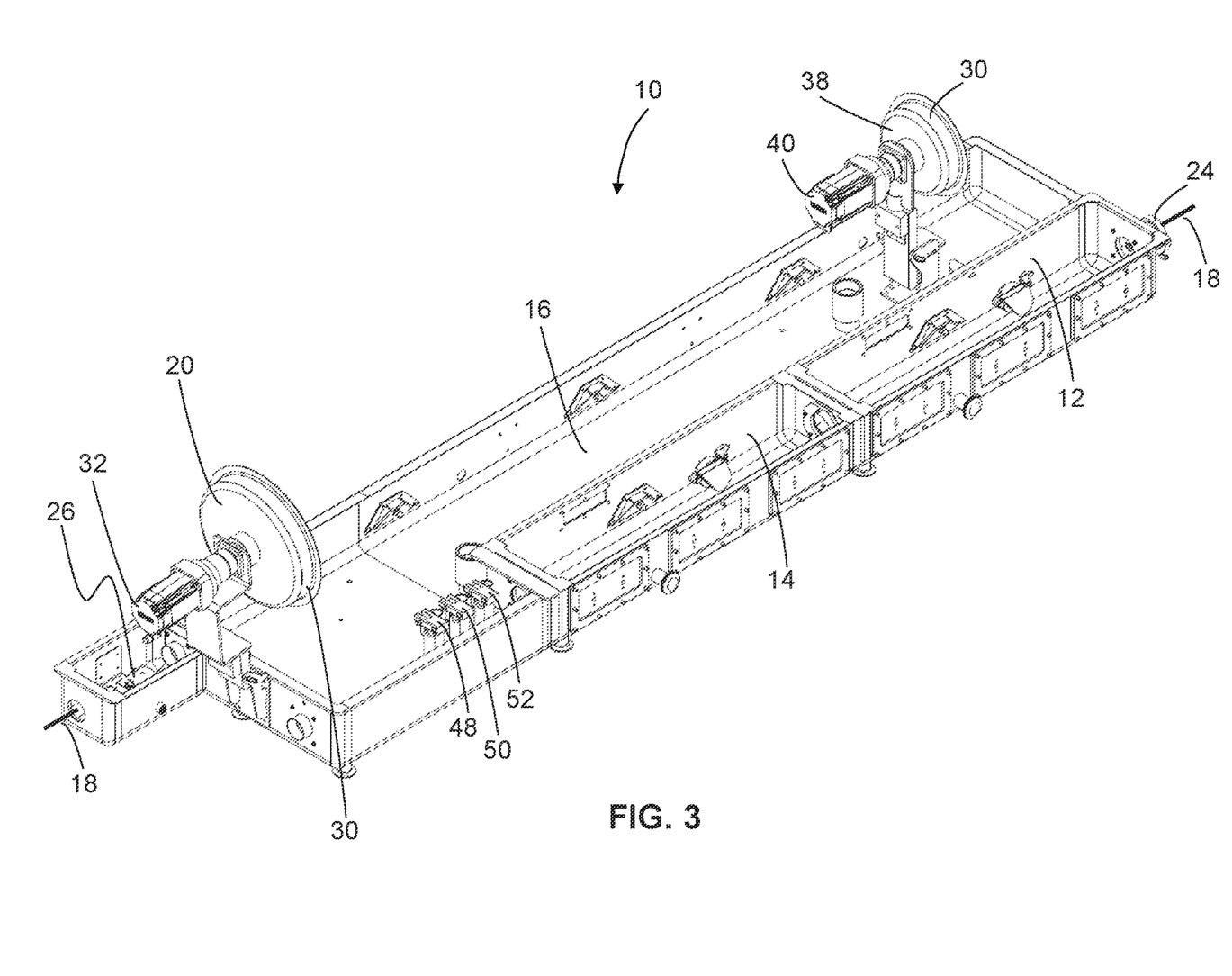
FIG. 3 is an isometric view of the extrudate cooling tank shown in FIG. 2, in the same level of detail as FIG. 2, but with the motor-wheel combinations rotated into a raised position such that there is disengagement of the wheels respecting the running extrudate.

Rotatable extrudate puller wheel 20 is desirably, but not necessarily, equipped with a silicon rubber band 30, not visible in FIG. 1, but visible in FIGS. 2 and 3, for adding to the gripping engagement force of wheel 20 with running extrudate 18. Band 30 is suitably sized and configured according to the size and configuration of the extrudate being cooled. The somewhat warm (due to having just exited the extruder), pliable and sometimes sticky character of the extrudate exterior allows rotatable extrudate puller wheel 20 and, when used, band 30 to grip the exterior of extrudate 18 sufficiently so that rotation of wheel 20 works to move the extrudate in the desired direction.

Considering FIG. 1, rotatable extrudate puller wheel 20 changes the direction of running extrudate 18 from a right-to-left direction in FIG. 1 to a left-to-right direction in FIG. 1, due to the rotation of rotatable extrudate puller wheel 20 while extrudate 18 is engaging the same.

Extrudate cooling tank 10 further preferably includes a variable speed motor schematically illustrated and designated 32 in FIGS. 1, 2 and 3 with variable speed motor 32 being directly operatively connected to rotatable extrudate puller wheel 20 in the manner of an integral assembly, with speed of motor 32 directly controlling the speed of rotation of rotatable extrudate puller wheel 20, to regulate physical parameters of the extrudate. The speed at which the extrudate moves while the extrudate is being cooled effects several physical parameters of the extrudate. Accordingly, control of extrudate speed through the cooling tank is important.

Extrudate cooling tank 10 further preferably includes a frame 34 shown in FIG. 2, with the assembly of variable speed motor 32 and puller wheel 20 being hingedly mounted on the frame for preferably arcuate movement between a first position at which the motor-puller wheel assembly 32/20 operatively positions puller wheel 20 in a location to engage extrudate 18 as shown in FIG. 2 and a second position at which the motor-puller wheel assembly 32/20 has moved arcuately away from the extrudate and puller wheel 20 has disengaged from extrudate 18, as shown in FIG. 3.

The extrudate cooling tank further preferably includes a processor which is desirably located within the housing of variable speed motor 32. The processor adjusts speed of variable speed motor 32 to control the rotational speed of rotatable extrudate puller wheel 20. The rotary speed of extrudate puller wheel 20 is adjustable thereby to regulate extrudate physical parameters, namely at least one of extrudate outer diameter, extrudate wall thickness, extrudate concentricity, and extrudate ovality, and prevents excessive shrinkage of the extrudate as it is cooled. The processor receives data for input to an algorithm that is preferably embedded within the memory of the processor and is a part thereof, with the algorithm serving to adjust the speed of variable speed motor 32.

The processor receives data from at least one of a strain gauge 48 measuring extrudate strain during running passage of extrudate 18 through cooling tank 10 and/or data from an ultrasonic gauge 50 measuring a first selected set of extrudate parameters during running passage of extrudate 18 through tank 10, with such parameters including at least one of outer diameter, wall thickness, concentricity, ovality, and shrinkage, and/or data from a laser gauge 52 measuring selected extrudate parameters such as outer diameter, wall thickness, concentricity, ovality, and shrinkage during running passage of extrudate 18 through tank 10. Strain gauge 48, ultrasonic gauge 50 and laser gauge 50 are all depicted schematically in FIGS. 1, 2 and 3.

As illustrated in FIG. 1, extrudate cooling tank 10 may preferably include an extrudate guide wheel 38 mounted within third water filled atmospheric chamber 16. Extrudate guide wheel 38 is positioned to receivably engage running extrudate that has previously engaged rotatable extrudate puller wheel 20, as illustrated in FIG. 1. A second variable speed motor-guide wheel combination 38/40 may be provided, with combination 38/40 being essentially similar to combination 32/20, and being hingedly angularly connected to the wall of one of the chambers of the tank in the same manner as combination 32/20. Combination 38/40 is movable arcuately to move guide wheel 38 into and out of engagement with extrudate 18, with speed of guide wheel 38 as controlled by motor 40 serving to further regulate physical parameters of the extrudate as the running extrudate is cooled.

It is within the scope of the invention to provide a gear train, a belt drive, and the like, none of which has been shown in the drawings, to permit use of a single motor to power both puller wheel 30 and extrudate guide wheel 38.

Strain gauge 48, ultrasonic gauge 50, and laser gauge 52 are all illustrated schematically in FIGS. 1, 2 and 3. The positioning of strain gauge 48, ultrasonic gauge 50, and laser gauge 52 may be varied according to the configuration of tank 10 and the environmental requirements of strain gauge 48, ultrasonic gauge 50, and laser gauge 52, to provide the required electronic data to processor 36.

Referring again to FIG. 1, a movable baffle 28 may be provided to allow an operator to vary the length of travel and time duration of travel of extrudate 18 through first and second water filled chambers 12, 14.

The extrudate cooling tank of the invention has particular applicability in providing a packaged, downstream extrusion solution for fabricating medical tubing, allowing low durometer thermoplastic, such as polyurethane medial tubing, to be cut precisely and cured on line as the tubing passes through the cooling tank. In one embodiment of the invention as illustrated in FIGS. 2 and 3 of the drawings, the tank is approximately eight feet long with three independent temperature zones, each temperature zone having a water pump, a heat exchanger, a recirculating valve and a heater, none of which are shown in detail in the drawings but all of which are well known to those of skill in the art.

It has been found that processing extrudate tubing in a cooling tank in accordance with the invention, with the tank being several times, typically two or three times, the typical length of known prior art cooling tanks, surface tack of the extrudate is minimized to such an extent that the extrudate can be cut to a desired length as the extrudate exits the tank. Using a tank in accordance with the invention, surprisingly it has been found that a short time window exists in which the extrudate tubes as they are first cut, may be permitted to contact each other without resulting stick-together. In other words, it has surprisingly been found that the extrudate/tube surface cures sufficiently that it loses its affinity for adjacent surfaces of the same material. The three tank approach of the invention has been found to be particularly efficacious for such extrudate/tube cooling/cutting applications.

In the practice of the invention, the initial tank, in a preferable three tank configuration, may be either at atmospheric pressure or under vacuum. In one exemplary practice of the invention, the initial tank water is maintained at between 110 and 130 degrees F., followed by a three foot length cold tank or chamber with water operating at from 45 to 55 degrees F. and then followed by a longer, about eighteen foot warming zone with water operating at from 90 to 110 degrees F. where the initial zone is also a three foot length zone consistently with the second zone. One arrangement of this type is shown in FIG. 1.

The multi-stage water tank approach of the invention as particularly implemented in the embodiment illustrated as FIG. 1 allows for curing of the extrudate melt to reduce shrinkage and minimize tact of the extrudate melt surface by allowing the polymer melt to properly organize with controlled cooling. The controlled cooling as provided by the tank of the invention and particularly the configuration illustrated in FIG. 1, allows use of this approach with various copolymers and semi-crystalline materials to control crystallization organization rates and improving quality of the resulting extrudate tubing.

With driven first and second wheels 20, 38 as illustrated in FIG. 1, the extrudate tubing normalizes or shrinks back, greatly reducing post-extrusion shrinkage. In a preferred implementation of the invention, first wheel 20 is a master or "puller" wheel, drawing the extrudate directly from the hot extrusion die and determining the sizing of the extrudate either alone or in contact with other internal air-based or non-contact vacuum sizing approaches. Desirably the first pass of the extrudate in the tank, as drawn by wheel 20, is the only pass through the tank during which the extrudate/tubing is under tension. The second wheel 38 is preferably adjusted to run at a percentage slower speed than first wheel 20 until the extrudate material floats to the surface of the tank, thereby allowing shrink-back online. The puller 20 speed may then also be adjusted to be slower than second wheel 38 to allow further shrink-back or normalization, before the extrudate tubing is cut to length. Savings in space represented by the three passes of the extrudate through the tank as illustrated schematically in FIG. 1 also results in space savings, which is important in processing plants.

The tank desirably uses tri-clover fittings as well as electro-polished, rounded corners to minimize the growth of biofilms. Both wheels 20, 38 are mounted on pivoting brackets together with servomotors 32, 40 that drive the wheels with the motors and wheels being essentially unitary combinations, allowing wheels 20, 38 to be moved perpendicularly away from the water surface, for through cleaning of the wheel and the tank.

The three tank approach of the invention, with variable, controlled and regulated temperature environments in each of the three tanks, works to substantially improve and shorten the time for curing of the extrudate to a state that the extrudate may be cut and stacked without tackiness or stickiness between cut segments. This provides a significant improvement over the prior art practice of running the extrudate through a single bath at as low a temperature as possible. Such single pass, low temperature cooling is undesirable—it changes the surface morphology of the extrudate sufficiently to reduce the tack, but increases variability of the physical parameters of the resulting tube by changing the stresses in the extrudate, leading to unpredictable changes in the final properties of the cooled extruded tubing. Specifically, tubing treated in such manner exhibits loss of physical properties such as tensile strength, stress resistance, elongation resistance, and chemical resistance.

In the cooling tank of the invention when the first chamber or tank is maintained at vacuum, namely somewhat below atmospheric pressure, with the vacuum being in the neighborhood of a one inch of water or more and even as much as a few inches of mercury, the result is improved sizing and ovality in the finished extruded tube. The advantage of having vacuum in the first tank is that once the vacuum is established, the tank interior environment is so stable that no water exits the tank as the extrudate enters, even if the extrudate entrance orifice is much larger than the extrudate outer diameter and the entrance is entirely well below the surface of the water. The vacuum is typically at least below one inch of water such that local plant internal air/vacuum can be used without unwanted water drool out of the tank. Controlling both vacuum level and water pump speed helps to minimize unwanted water turbulence, especially when tank vacuum levels are low, namely close to atmospheric pressure.

The combination of the three temperature zones and the minimization of extrudate tension through regulation of at least puller wheel speed permits the extrudate tubing to be cut to length with consistent shrinkage when using the exemplary temperature profiles outlined herein. Using the tank of the invention, with suitable cutting, bushing and blades, even large diameter, thin walled polymer extrudate can be cut to lengths successfully online as the extrudate exists the extruder. Using the three tank approach of the invention with the initial tank at vacuum, namely somewhat below atmospheric pressure as disclosed herein, extrudate speeds through the three tank system can range from twenty to fifty feet per minute. Use of the inventive three tank system as disclosed herein with the first tank maintained at vacuum, namely below atmospheric pressure, and all three tanks being maintained at the temperate profiles as outlined herein, greatly improves throughput rate of the extrudate, with better quality, more consistent extruded tubing resulting that has been known heretofore.

The invention further embraces use of a high speed tank, having only two active zones and four wheels with one wheel being a puller wheel and the remaining three being guide wheels that may be idlers, but are preferably powered. The high speed of the extrudate moving through the high speed tank, having only two active zones, precludes any treatment of the extrudate other than cooling, but provides a huge improvement in the throughput rate of finished extrudate tubing. The high speed two active zone tank has not been shown in the drawings but will be immediately apparent to one of skill in the art as respecting modification of the three zone drawings provided herewith.

A major advantage of this invention is that the servomotor/wheel combinations that are rotatably moveable around hinge connections from a position at which the associated wheels are within the tank in an operating condition, to a position at which the wheels are above the tank, out of the water and oriented with their axes of rotation essentially parallel to the extrudate passing through the tank, puts the servomotor/wheel combinations in a position where the moving parts are easily serviced and replaced, all being out of the water.

Quick release pins are used to allow easy removal of the wheel/servomotor combination assemblies. These assemblies are tiltable, as shown in the drawings and rotatable adjustably about the hinge axes, and the wheel axes to provide tracking adjustment for the extrudate through the tank and around the respective wheels. Desirably, there is silicone rubber banding 30 on each of the wheels, which improves friction and facilitates extrudate pulling; the silicone rubber band is also readily serviceable and replaceable when the associated wheel is out of the water.

The hinged character of the motor-wheel assemblies allows those assemblies to be tilted upwards to provide full access for mechanical cleaning of the tank chambers, which is typically required to remove pyrogenic biofilm at periodic intervals.

Although schematic implementations of present invention and at least some of its advantages are described in detail hereinabove, it should be understood that various changes, substitutions and alterations may be made to the apparatus and methods disclosed herein without departing from the spirit and scope of the invention as defined by the appended claims. The disclosed embodiments are therefore to be considered in all respects as being illustrative and not restrictive with the scope of the invention being indicated by the appended claims rather than by the foregoing description. All changes which come within the meaning and range of equivalency of the claims are therefore intended to be embraced therein. Moreover, the scope of this patent application is not intended to be limited to the particular implementations of apparatus and methods described in the specification, nor to any methods that may be described or inferentially understood by those skilled in the art to be present as described in this specification.

As disclosed above and from the foregoing description of exemplary embodiments of the invention, it will be readily apparent to those skilled in the art to which the invention pertains that the principles and particularly the compositions and methods disclosed herein can be used for applications other than those specifically mentioned. Further, as one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for operation of the invention." The scope of the invention is, therefore, indicated by the appended claims rather than by the foregoing description and all changes which come within the range of equivalency of the claims are to be considered to be embraced within the scope of the claims. Additional objects, other advantages, and further novel features of the invention will become apparent from study of the appended claims as well as from study of the foregoing detailed discussion and description of the preferred embodiments of the invention, as that study proceeds.

The invention claimed is:

1. An extrudate cooling tank, comprising:
   a) a controlled pressure first temperature water chamber adapted for running passage of an extrudate therethrough;
   b) a controlled pressure second temperature water chamber adapted for continued running passage of the extrudate therethrough;

c) a controlled pressure third temperature water chamber adapted for further continued running passage of the extrudate therethrough;

d) a rotatable extrudate puller wheel positionable for receivably engaging the running extrudate in one of the water chambers and controlling a speed of the running extrudate as the extrudate engagingly moves with the rotatable puller wheel; and e) a variable speed motor connected to the puller wheel for controlling a speed thereof to regulate at least one physical parameter of the extrudate, the motor being rotatably connected to the tank for arcuate unitary movement of the motor and puller wheel together between a first position at which the puller wheel engages the running extrudate and a second position at which there is no engagement of the running extrudate by the puller wheel.

2. The extrudate cooling tank of claim 1 further comprising a processor for adjusting the speed of the motor turning the puller wheel thereby controlling the speed of the extrudate to regulate extrudate physical parameters including at least one of outer diameter, wall thickness, concentricity, and ovality, and to prevent extrudate shrinkage, the processor receiving data, for input to an included algorithm to adjust the motor speed, from at least one of:

a) a strain gauge measuring extrudate strain during running passage of the extrudate through the tank;

b) an ultrasonic gauge measuring selected extrudate parameters during running passage of the extrudate through the tank; and c) a laser gauge measuring selected extrudate parameters during running passage of the extrudate through the tank.

3. The extrudate cooling tank of claim 1 further comprising:

a) an extrudate guide wheel mounted within the third temperature water chamber, for receivably engaging the running extrudate having engaged the puller wheel; and b) a second variable speed motor connected to the guide wheel for controlling and adjusting a speed thereof to further regulate physical parameters of the extrudate.

4. The extrudate cooling tank of claim 1 further comprising:

a) a preskinner chamber adjoining the first temperature water chamber at an extrudate entrance, for retaining water in surrounding contact with the running extrudate as the running extrudate passes into the first temperature water chamber; and b) an air wipe chamber adjoining the third temperature water chamber at an extrudate exit therefrom, for removing water from a running extrudate exterior when exiting the third temperature water chamber while precluding escape of water therefrom.

5. A method of controlling a speed of a running extrudate during cooling thereof comprising:

pivotally moving a motor-puller wheel assembly between a first position at which the wheel engages the running extrudate within a controlled temperature bath thereby cooling the extrudate to regulate at least one of extrudate outer diameter, wall thickness, concentricity, ovality, and shrinkage, and a second position at which the puller wheel does not engage the running extrudate to regulate extrudate physical parameters.

6. The method of claim 5 further comprising:

adjusting a speed of the motor connected to the puller wheel, responsively to algorithmic processed data of at least one of:

i) extrudate strain measured during running passage of the extrudate through one of a plurality of water baths including the controlled temperature bath;

ii) ultrasonically measured selected extrudate dimensional parameters during running passage of the extrudate through one of the water baths; and iii) laser measured selected extrudate dimensional parameters during running passage of the extrudate through one of the water baths.

7. The method of claim 6 further comprising controlling the water bath temperatures independently one of another.

8. The method of claim 7 wherein the water baths are contiguous one with another.

9. An extrudate cooling tank, comprising:

a) a plurality of cooling water chambers adapted for running passage of an extrudate serially therethrough, a respective first cooling water chamber being at a preselected regulated variable pressure and respective remaining cooling water chambers being at least at atmospheric pressure, water in the chambers being at different temperatures;

b) a rotatable extrudate puller wheel-servo motor combination hingedly connected to one of the remaining cooling water chambers and movable with respect thereto between two positions, the combination in a first position positioning the puller wheel to receivably engage the running extrudate to rotatably controlling a speed of the running extrudate by contact therewith, the combination in a second position positioning the puller wheel remote from a position of engagement with the running extrudate.

10. The extrudate cooling tank of claim 9 further comprising:

a processor for adjusting a speed of the motor turning the puller wheel thereby controlling the speed of the extrudate to regulate extrudate outer diameter, wall thickness, concentricity, and ovality, and to prevent extrudate shrinkage, the processor receiving data, for input to an algorithm portion thereof for adjusting the motor speed, from:

i) a strain gauge measuring extrudate strain during running passage of the extrudate through the tank;

ii) an ultrasonic gauge measuring selected first extrudate dimensional parameters during running passage of the extrudate through the tank; and iii) a laser gauge measuring selected second extrudate dimensional parameters during running passage of the extrudate through the tank.

11. The extrudate cooling tank of claim 10 further comprising an extrudate guide wheel positionable within the same cooling water chamber as the puller wheel, for receivably engaging the running extrudate having engagingly passed around the puller wheel; the extrudate guide wheel and a second variable speed motor forming an assembly and being mounted on a frame for arcuate movement between a position at which the guide wheel operatively engages the extrudate in the same chamber and a position at which the guide wheel is disengaged from the extrudate, the second motor when connected to the guide wheel adjusting a speed thereof to further regulate outer diameter and wall thickness of the extrudate.

12. The extrudate cooling tank of claim 11 further comprising:

a) the extrudate guide wheel within a serially respective third temperature water chamber of the plurality of cooling water chambers, for receivably engaging the running extrudate having passed around the puller wheel; and b) a gearing system for connecting the variable speed motor to the extrudate guide wheel and adjusting the speed thereof to further regulate outer diameter and wall thickness of the extrudate.

13. A two chamber extrudate cooling tank, comprising:

a) a controlled pressure first temperature water chamber adapted for running passage of an extrudate therethrough;

b) a controlled pressure second temperature water chamber adapted for continued running passage of the extrudate therethrough;

c) a rotatable extrudate puller wheel positionable for receivably engaging the running extrudate and controlling a speed of the running extrudate as the extrudate engagingly moves with the rotating puller wheel;

d) a plurality of guide wheels positioned in the tank downstream of the puller wheel to successively contactingly guide the running extrudate through the tank; and e) a variable speed motor connected to the puller wheel for controlling a speed thereof, the motor being rotatably connected to the tank for arcuate unitary movement of the motor and puller wheel together between a first position at which the puller wheel engages the running extrudate and a second position at which there is no engagement of the running extrudate by the puller wheel.

14. The two chamber extrudate cooling tank of claim 13 in which at least some of the guide wheels are idlers.

15. The two chamber extrudate cooling tank of claim 13 further comprising variable speed motors connected to at least some of the guide wheels, the guide wheel motors being rotatably connected to the tank for arcuate unitary movement of the respective motor and the respective connected guide wheel together between a first position at which the respective connected guide wheel engages the running extrudate and a second position at which there is no engagement of the running extrudate by the respective connected guide wheel.

* * * * *